United States Patent
Brown et al.

(10) Patent No.: US 11,274,220 B2
(45) Date of Patent: *Mar. 15, 2022

(54) HYDROPHOBIC EXTENDERS IN NON-FLUORINATED SURFACE EFFECT COATINGS

(71) Applicant: THE CHEMOURS COMPANY FC, LLC, Wilmington, DE (US)

(72) Inventors: Gerald Oronde Brown, Swedesboro, NJ (US); John Christopher Sworen, Lincoln University, PA (US); Charles Karanja, Newark, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/764,924

(22) PCT Filed: Sep. 30, 2016

(86) PCT No.: PCT/US2016/054597
§ 371 (c)(1),
(2) Date: Mar. 30, 2018

(87) PCT Pub. No.: WO2017/059167
PCT Pub. Date: Apr. 6, 2017

(65) Prior Publication Data
US 2018/0320005 A1    Nov. 8, 2018

Related U.S. Application Data

(60) Provisional application No. 62/236,329, filed on Oct. 2, 2015.

(51) Int. Cl.
| | | |
|---|---|---|
| C09D 7/63 | (2018.01) |
| C09D 5/16 | (2006.01) |
| C09D 7/40 | (2018.01) |
| C08J 7/04 | (2020.01) |
| C08J 7/054 | (2020.01) |
| D06M 13/148 | (2006.01) |
| D06M 13/224 | (2006.01) |
| C09D 5/00 | (2006.01) |
| C09D 133/10 | (2006.01) |
| D06M 13/17 | (2006.01) |
| D06M 23/10 | (2006.01) |
| C08K 5/103 | (2006.01) |
| C09D 7/47 | (2018.01) |
| C08K 5/1535 | (2006.01) |
| C08F 220/24 | (2006.01) |
| C08J 7/044 | (2020.01) |
| D06M 13/165 | (2006.01) |
| D06M 15/263 | (2006.01) |
| C08F 2/44 | (2006.01) |
| C08F 2/22 | (2006.01) |
| C08K 5/11 | (2006.01) |
| D06M 101/32 | (2006.01) |
| D06M 101/34 | (2006.01) |

(52) U.S. Cl.
CPC .............. C09D 7/63 (2018.01); C08F 220/24 (2013.01); C08J 7/044 (2020.01); C08J 7/0427 (2020.01); C08J 7/054 (2020.01); C09D 5/00 (2013.01); C09D 5/1681 (2013.01); C09D 7/40 (2018.01); C09D 133/10 (2013.01); D06M 13/148 (2013.01); D06M 13/165 (2013.01); D06M 13/17 (2013.01); D06M 13/224 (2013.01); D06M 15/263 (2013.01); D06M 23/10 (2013.01); C08F 2/22 (2013.01); C08F 2/44 (2013.01); C08J 2367/00 (2013.01); C08J 2377/00 (2013.01); C08K 5/103 (2013.01); C08K 5/11 (2013.01); C08K 5/1535 (2013.01); C09D 7/47 (2018.01); D06M 2101/32 (2013.01); D06M 2101/34 (2013.01); D06M 2200/01 (2013.01); D06M 2200/11 (2013.01); D06M 2200/12 (2013.01)

(58) Field of Classification Search
CPC combination set(s) only.
See application file for complete search history.

(56) References Cited

U.S. PATENT DOCUMENTS

| | | | |
|---|---|---|---|
| 2,466,672 A * | 4/1949 | Habib | ................ C09D 191/08 524/110 |
| 2,640,038 A | 5/1953 | Wilder et al. | |
| 2,737,458 A | 3/1956 | Burnham | |

(Continued)

FOREIGN PATENT DOCUMENTS

| | | | |
|---|---|---|---|
| CA | 2338024 A1 * | 2/2000 | ........ D06M 15/3568 |
| CN | 101535363 | 9/2009 | |

(Continued)

OTHER PUBLICATIONS

Machine translation of CN 104726022 A, retrieved Jan. 2020 (Year: 2020).*

(Continued)

*Primary Examiner* — Nicole M. Buie-Hatcher

(57) ABSTRACT

The present invention relates to a coated article comprising a partial or complete durable non-fluorinated coating on the surface of an article, wherein the coating comprises 5 to 95% by weight of a hydrophobic compound, and 5 to 95% by weight of a surface effect agent, both based on the total solids weight of the coating, where the hydrophobic compound is selected from a hydrophobic cyclic or acyclic alcohol.

13 Claims, No Drawings

(56) References Cited

U.S. PATENT DOCUMENTS

| | | | |
|---|---|---|---|
| 3,415,661 A * | 12/1968 | Sincock | C08J 7/047 |
| | | | 426/125 |
| 3,427,265 A * | 2/1969 | Brinker | C09D 191/08 |
| | | | 524/57 |
| 3,455,726 A | 7/1969 | Mitchell et al. | |
| 3,736,287 A | 5/1973 | Patella | |
| 3,749,690 A * | 7/1973 | Patella | C08F 220/12 |
| | | | 524/555 |
| 3,960,797 A | 6/1976 | Inman | |
| 4,170,585 A * | 10/1979 | Motegi | A61L 24/06 |
| | | | 428/428 |
| 4,467,068 A * | 8/1984 | Maruyama | C03C 17/30 |
| | | | 428/429 |
| 4,565,647 A | 1/1986 | Llenado | |
| 4,595,518 A | 6/1986 | Raynolds et al. | |
| 4,946,375 A * | 8/1990 | Day | C08J 5/06 |
| | | | 428/375 |
| 5,221,557 A | 6/1993 | Hunter et al. | |
| 5,593,483 A | 1/1997 | Brunken | |
| 5,753,373 A * | 5/1998 | Scholz | C09D 1/00 |
| | | | 106/287.11 |
| 5,925,607 A | 7/1999 | Flanagan | |
| 5,925,698 A | 7/1999 | Steckel | |
| 5,932,328 A | 8/1999 | Burke et al. | |
| 6,153,675 A | 11/2000 | Yamamoto et al. | |
| 6,274,060 B1 | 8/2001 | Sakashita et al. | |
| 6,309,984 B1 | 10/2001 | Nonaka et al. | |
| 6,319,982 B1 * | 11/2001 | Huang | C08G 77/50 |
| | | | 427/387 |
| 6,491,746 B2 | 12/2002 | Summerfield | |
| 6,524,978 B1 | 2/2003 | Moore | |
| 6,656,998 B1 | 12/2003 | Robeson | |
| 7,731,881 B2 * | 6/2010 | Dean | C08J 7/047 |
| | | | 106/13 |
| 7,820,745 B2 | 10/2010 | Kashiwagi | |
| 8,026,188 B2 | 9/2011 | Mor | |
| 8,716,392 B2 | 5/2014 | Bartley et al. | |
| 9,029,452 B2 | 5/2015 | Brown et al. | |
| 9,056,987 B2 | 6/2015 | Sunder et al. | |
| 9,845,410 B2 | 12/2017 | Sworen et al. | |
| 9,938,431 B2 | 4/2018 | Sworen et al. | |
| 2004/0082699 A1 | 4/2004 | Brown | |
| 2004/0219120 A1 | 11/2004 | Mougin | |
| 2005/0022309 A1 * | 2/2005 | Thioliere | D06M 15/576 |
| | | | 8/94.15 |
| 2005/0207824 A1 * | 9/2005 | Ichikawa | C09D 11/18 |
| | | | 401/209 |
| 2005/0227893 A1 | 10/2005 | Johnson | |
| 2005/0233135 A1 * | 10/2005 | Iyer | C03C 17/007 |
| | | | 428/331 |
| 2006/0186368 A1 | 8/2006 | Liu et al. | |
| 2007/0049683 A1 * | 3/2007 | Kim | C08G 18/792 |
| | | | 524/507 |
| 2007/0088141 A1 | 4/2007 | Kashiwagi | |
| 2007/0293654 A1 | 12/2007 | Kashiwagi | |
| 2008/0090480 A1 | 4/2008 | Akimoto et al. | |
| 2008/0148491 A1 | 6/2008 | Van Buskirk | |
| 2010/0035493 A1 | 2/2010 | Oki | |
| 2010/0173079 A1 | 7/2010 | Akiyama et al. | |
| 2010/0209361 A1 | 8/2010 | Meier et al. | |
| 2010/0255215 A1 | 10/2010 | Han et al. | |
| 2010/0266648 A1 | 10/2010 | Ranade et al. | |
| 2011/0046283 A1 | 2/2011 | Grass | |
| 2011/0218285 A1 * | 9/2011 | Stockl | C09D 193/04 |
| | | | 524/308 |
| 2012/0071382 A1 * | 3/2012 | Wang | C08L 83/08 |
| | | | 510/222 |
| 2012/0129982 A1 | 5/2012 | Zipplies et al. | |
| 2013/0131226 A1 | 5/2013 | Goredema et al. | |
| 2013/0184387 A1 | 7/2013 | Tahara et al. | |
| 2014/0031145 A1 | 1/2014 | Kitamura et al. | |
| 2014/0295724 A1 | 10/2014 | Sworen et al. | |
| 2014/0296123 A1 | 10/2014 | Sworen et al. | |
| 2014/0296386 A1 | 10/2014 | Maeda et al. | |
| 2015/0004351 A1 | 1/2015 | Iverson et al. | |
| 2015/0064476 A1 | 3/2015 | Kanda | |
| 2015/0267074 A1 * | 9/2015 | Heine | C08K 5/54 |
| | | | 523/400 |
| 2016/0090508 A1 | 3/2016 | Sworen et al. | |
| 2016/0090560 A1 | 3/2016 | Sworen et al. | |
| 2016/0090686 A1 | 3/2016 | Sworen et al. | |
| 2018/0002563 A1 * | 1/2018 | Taylor | C09D 151/003 |

FOREIGN PATENT DOCUMENTS

| | | | |
|---|---|---|---|
| CN | 102060956 A | 5/2011 | |
| CN | 102490229 | 6/2012 | |
| CN | 104194724 | 12/2014 | |
| CN | 104389180 A | 3/2015 | |
| CN | 104726022 A * | 6/2015 | |
| CN | 103750583 B | 9/2015 | |
| EP | 0738800 A2 | 10/1996 | |
| EP | 1609379 A1 | 12/2005 | |
| EP | 1754761 A1 | 2/2007 | |
| EP | 1788047 | 5/2007 | |
| JP | 01132885 A * | 5/1989 | |
| JP | H05-271359 A | 3/1992 | |
| JP | H04-218650 | 8/1992 | |
| JP | H05-302065 | 11/1993 | |
| JP | 2004-531598 | 1/1995 | |
| JP | H07-011467 A | 1/1995 | |
| JP | H07-145560 | 6/1995 | |
| JP | H10-036664 | 2/1998 | |
| JP | H10-273879 | 10/1998 | |
| JP | 2003-193367 A | 7/2003 | |
| JP | 2004-506054 A | 2/2004 | |
| JP | 2007-84668 A | 9/2005 | |
| JP | 2010-119686 A | 6/2010 | |
| JP | 2011-507865 A | 3/2011 | |
| JP | 2012-036351 A | 2/2012 | |
| JP | 2013-144772 A | 7/2013 | |
| JP | 2013-189558 A | 9/2013 | |
| JP | 2014-042798 A | 3/2014 | |
| JP | 2015-120895 A | 7/2015 | |
| JP | 2012-224956 A | 11/2015 | |
| KR | 101371271 B1 * | 3/2014 | |
| KR | 20140126374 A * | 10/2014 | C08K 5/0016 |
| WO | 95/18195 | 7/1995 | |
| WO | 2002/064696 A1 | 8/2002 | |
| WO | 2012/063756 A1 | 5/2012 | |
| WO | 2012/170832 A | 12/2012 | |
| WO | 2013061061 A | 5/2013 | |
| WO | 2013061061 A1 | 5/2013 | |
| WO | WO-2014064899 A1 * | 5/2014 | B41J 2/1752 |
| WO | 2014160906 A | 10/2014 | |
| WO | 20140160905 A | 10/2014 | |
| WO | 2016049293 A | 3/2016 | |

OTHER PUBLICATIONS

Abstract of CN 104726022 A, 2016 (Year: 2016).*
Ash et al. (2009). Industrial Chemical Thesaurus (5th Edition)-Polyquaternium-11 to Polystyrene, expandable, pp. 2283-2284. Synapse Information Resources, Inc. Retrieved from https://app.knovel.com/hotlink/pdf/id:kt008H9C81/industrial-chemical-thesaurus/polyquaternium-11-polystyrene. (Year: 2009).*
Tadros et al. (2014) Introduction to Surfactants-2.4.4. Sorbitan Esters and Their Ethoxylated Derivatives (Spans and Tweens). DeGruyler. (Year: 2014).*
Machine translation of JP 01132885 A, retrieved Jan. 2021 (Year: 2021).*
Machine translation of KR 101371271 B1 (Year: 2021).*
International Search Report and Written Opinion in PCT/US2016/054597 dated Dec. 7, 2016.
Pepper, Relationship of the Chemical Constitution of Ethoxylated Fatty Acid Esters of Sorbitol and Their Antistatic Properties When Applied to Polypropylene Carpeting, Thesis, Georgia Institute of Technology, Oct. 1969.

* cited by examiner

HYDROPHOBIC EXTENDERS IN NON-FLUORINATED SURFACE EFFECT COATINGS

FIELD OF THE INVENTION

Hydrophobic substituted ester alcohols are employed as extenders for surface effect agents in coatings to provide enhanced surface effects to various articles.

BACKGROUND OF THE INVENTION

Various compositions are known to be useful as treating agents to provide surface effects to substrates. Surface effects include repellency to moisture, soil and stain resistance, and other effects which are particularly useful for fibrous substrates such as fibers, fabrics, textiles, carpets, paper, leather and other such substrates. Many such treating agents are partially fluorinated polymers or copolymers.

Fluorinated polymer compositions having utility as fibrous substrate treating agents generally contain pendant perfluoroalkyl groups of three or more carbon atoms, which provide oil- and water-repellency when the compositions are applied to fibrous substrate surfaces. The perfluoroalkyl groups are generally attached by various connecting groups to polymerizable groups not containing fluorine. The resulting monomer is then generally copolymerized with other monomers which confer additional favorable properties to the substrates. Various specialized monomers may be incorporated to impart improved cross-linking, latex stability and substantivity. Since each ingredient may impart some potentially undesirable properties in addition to its desirable ones, the specific combination is directed to the desired use. These polymers are generally marketed as aqueous emulsions for easy application to the fibrous substrates.

Various attempts have been made to increase the oil- and water-repellency imparted to the substrate and its durability while reducing the amount of fluorinated polymer required, i.e., boost the efficiency or performance of the treating agent. One method is to incorporate blocked isocyanates or melamine resins. However, only limited amounts can be used because these ingredients tend to adversely affect the handle (the feel) of the fibrous substrate. Another approach employs use of various extender polymers. These are typically hydrocarbon polymers in aqueous emulsions, which are blended with the fluorinated polymer emulsion before application to the substrate.

U.S. Pat. No. 7,820,745 discloses aqueous water- and oil-repellent compositions containing a fluorinated copolymer in aqueous medium and a sorbitan ester used in small amounts to act as a surfactant.

BRIEF SUMMARY OF THE INVENTION

There is a need for surface effect compositions which provide hydrophobicity performance with improved fluorine efficiency. The present invention provides such a composition.

The present invention comprises a coated article comprising a partial or complete durable non-fluorinated coating on the surface of an article, wherein the coating comprises 5 to 95% by weight of a hydrophobic compound, and 5 to 95% by weight of at least one surface effect agent, both based on the total solids weight of the coating, selected from a cyclic or acyclic alcohol which is substituted with at least two $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic or acyclic alcohol is selected from a pentaerythritol, saccharide, reduced sugar, aminosaccharide, citric acid, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently $-H$, a linear or branched alkyl group having 6 to 30 carbons optionally comprising at least 1 unsaturated bond.

The present invention further comprises a method of imparting a surface effect to an article comprising contacting a the surface of the article with a durable non-fluorinated coating to form a partially or completely coated article, wherein the coating comprises 5 to 95% by weight of a hydrophobic compound, and 5 to 95% by weight of at least one surface effect agent, both based on the total solids weight of the coating, selected from a cyclic or acyclic alcohol which is substituted with at least two $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic or acyclic alcohol is selected from a pentaerythritol, saccharide, reduced sugar, aminosaccharide, citric acid, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently $-H$, a linear or branched alkyl group having 6 to 30 carbons optionally comprising at least 1 unsaturated bond.

DETAILED DESCRIPTION OF THE INVENTION

Trademarks are indicated herein by capitalization.

The present invention provides coated articles having improved water repellency, oil or stain repellency, and/or other hydrophobic surface effects. The treated articles provide enhanced performance and durability compared to traditional non-fluorinated commercially available treatment agents. The coating materials of the present invention can be derived from bio-sourced materials. The coatings formed are durable, by which is meant that the coatings are lasting films that are not readily removed by water or cleaning agents. In one aspect, the coatings are not soluble or dispersable in water or cleaning agents once they are dry, and in another aspect, the coatings withstand multiple cleanings without loss of performance. For example, the coating retains some water repellency, oil repellency, or water spray performance after 30 home washes as described in the examples below.

The present invention relates to a coated article comprising a partial or complete coating on the surface of an article, wherein the coating comprises 5 to 95% by weight of a hydrophobic compound, and 5 to 95% by weight of at least one surface effect agent, both based on the total solids weight of the coating, selected from a cyclic or acyclic sugar alcohol which is substituted with at least one $-R^1$, $-C(O)R^1$, $-(CH_2CH_2O)_n(CH(CH_3)CH_2O)_mR^2$, $-(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently $-H$, a linear or branched alkyl group having 6 to 30 carbons optionally comprising at least 1 unsaturated bond. The —(CH$_2$CH$_2$O)— represents oxyethylene groups (EO) and —(CH(CH$_3$)CH$_2$O)— represents oxypropylene groups (PO). These compounds can contain only EO groups, only PO groups, or mixtures thereof. These compounds can also be present as a tri-block copolymer designated PEG-PPG-PEG (polyethylene glycol-polypropylene glycol-polyethylene glycol), for example. In one embodiment, n+m is 1 to 20; in another embodiment, n+m is 1 to 15; and in a third embodiment, n+m is 1 to 12.

In another aspect, the invention relates to a coated article comprising a partial or complete durable non-fluorinated coating on the surface of an article, wherein the coating comprises 5 to 95% by weight of a hydrophobic compound, and 5 to 95% by weight of at least one surface effect agent, both based on the total solids weight of the coating, selected from a cyclic or acyclic alcohol which is substituted with at least two —R$^1$, —C(O)R$^1$, —(CH$_2$CH$_2$O)$_n$(CH(CH$_3$)CH$_2$O)$_m$R$^2$, —(CH$_2$CH$_2$O)$_n$(CH(CH$_3$)CH$_2$O)$_m$C(O)R$^1$, or mixtures thereof; where the cyclic or acyclic alcohol is selected from a pentaerythritol, saccharide, reduced sugar, aminosaccharide, citric acid, aldonic acid, or aldonic acid lactone; wherein each n is independently 0 to 20; each m is independently 0 to 20; m+n is greater than 0; each R$^1$ is independently a linear or branched alkyl group having 5 to 29 carbons optionally comprising at least 1 unsaturated bond; each R$^2$ is independently —H, a linear or branched alkyl group having 6 to 30 carbons optionally comprising at least 1 unsaturated bond.

The hydrophobic compound may be a multi-ester alcohol having at least two hydrophobic substitutions, which originates from a polyol or polycarboxylic acid compound. Examples of suitable polyols include but are not limited to cyclic or acyclic sugar alcohols, or pentaerythritols including dipentaerythritol. Suitable polycarboxylic acid compounds include citric acid. The cyclic or acyclic sugar alcohol is selected from a saccharide, reduced sugar, aminosaccharide, aldonic acid, or aldonic acid lactone. Mixtures of these compounds may also be used. The hydrophobic compounds are substituted with at least two —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof. Such a substitution lends hydrophobic character to the monomer, and to the polymer molecules. In one embodiment, the hydrophobic compound is substituted with at least three —R$^1$; —C(O)R$^1$; —(CH$_2$CH$_2$O)$_n$(CH(CH$_3$)CH$_2$O)$_m$R$^2$; —(CH$_2$CH$_2$O)$_n$(CH(CH$_3$)CH$_2$O)$_m$C(O)R$^1$; or mixtures thereof.

These substituted compounds can be made by the reaction of a sugar alcohol with at least one fatty acid or alkoxylated fatty acid, such as by esterification of a fatty acid; or by esterification of a polycarboxylic acid with a long-chain alcohol. Examples of such sugar alcohols include but are not limited to aldoses and ketoses such as those compounds derived from tetroses, pentoses, hexoses, and heptoses. Specific examples include glucose, 1,4-anhydro-D-glucitol, 2,5-anhydro-D-mannitol, 2,5-anhydro-L-iditol, sorbitan, glyceraldehyde, erythrose, arabinose, ribose, arabinose, allose, altrose, mannose, xylose, lyxose, gulose, glactose, talose, fructose, ribulose, mannoheptulose, sedohelptulose, threose, erythritol, threitol, glucopyranose, mannopyranose, talopyranose, allopyranose, altropyranose, idopyranose, gulopyranose, glucitol, mannitol, erythritol, sorbitol, arabitol, xylitol, ribitol, galactitol, fucitol, iditol, inositol, pentaerythritol, dipentaerythritol, volemitol, gluconic acid, glyceric acid, xylonic acid, galactaric acid, ascorbic acid, citric acid, gluconic acid lactone, glyceric acid lactone, xylonic acid lactone, glucosamine, galactosamine, or mixtures thereof.

Suitable fatty acids include, but are not limited to, caprylic acid, capric acid, lauric acid, mysteric acid, palmitic acid, stearic acid, arachidic acid, behenic acid, lignoceric acid, palmitoleic acid, lineolic acid, oleic acid, erucic acid, alkoxylated versions of these acids, and mixtures thereof. In one embodiment, R$^1$ is a linear or branched alkyl group having 11 to 29 carbons, and in another embodiment, R$^1$ is a linear or branched alkyl group having 17 to 21 carbons. In one embodiment, R$^2$ is a linear or branched alkyl group having 12 to 30 carbons, in another embodiment, R$^2$ is a linear or branched alkyl group having 18 to 30 carbons, and in another embodiment, R$^2$ is a linear or branched alkyl group having 18 to 22 carbons. In one embodiment, the fatty acid substitution of the cyclic or acyclic sugar alcohols has a melting point of at least −59° C. In another embodiment, the fatty acid substitution of the cyclic or acyclic sugar alcohols has a melting point of at least 0° C., and in a third embodiment, the fatty acid substitution of the cyclic or acyclic sugar alcohols has a melting point of at least 40° C.

In one embodiment, the hydrophobic compound is selected from Formulas formulas (Ia), (Ib), or (Ic):

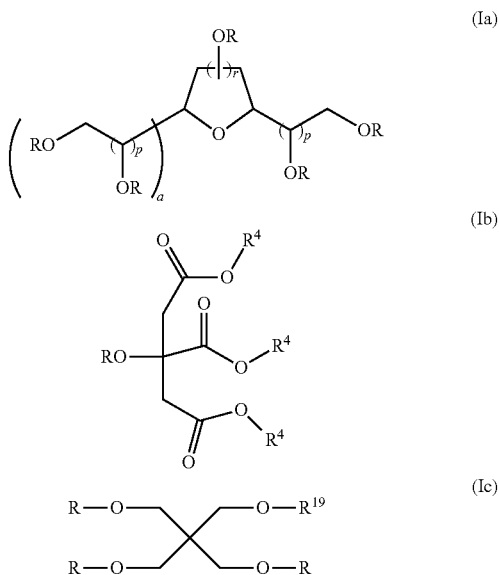

wherein each R is independently —H; —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; each n is independently 0 to 20; each m is independently 0 to 20; m+n is greater than 0; r is 1 to 3; a is 0 or 1; p is independently 0 to 2; provided that a is 0 when r is 3; each R$^1$ is independently a linear or branched alkyl group having 5 to 29 carbons optionally comprising at least 1 unsaturated bond; each R$^2$ is independently —H, or a linear or branched alkyl group having 6 to 30 carbons optionally comprising at least 1 unsaturated bond; provided when formula (Ia) is chosen, then at least one R is —H and at least two R groups are a —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; each R$^4$ is independently —H, a linear or branched alkyl group having 6 to 30 carbons optionally comprising at least 1 unsaturated bond, or combinations thereof; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; provided when formula (Ib) is chosen, then at least one R or R$^4$ is —H; and at least two of R or R$^4$ is a linear or branched alkyl optionally comprising at least 1 unsaturated bond, or combinations thereof; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$; and each R$^{19}$ is —H, —C(O)R$^1$, or —CH$_2$C[CH$_2$OR]$_3$, provided when formula (Ic) is chosen, then at least one R$^{19}$ or R is —H; and at least two of R$^{19}$ or R is —C(O)R$^1$, —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$. In one aspect, R, R$^1$, R$^4$, and R$^{19}$ are saturated linear or branched alkyl groups.

Where the hydrophobic compound is formula (Ia), any suitable substituted reduced sugar alcohol may be employed, including esters of 1,4-sorbitan, esters of 2,5-sorbitan, and esters of 3,6-sorbitan. In one embodiment, the hydrophobic compound is selected from Formula (a) to be formula (Ia'):

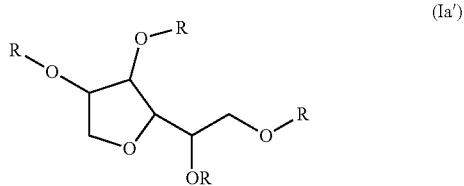

(Ia')

wherein R is further limited to —H; —R$^1$; or —C(O)R$^1$ and at least two R groups are —C(O)R$^1$ or R$^1$. Compounds used to form residues of Formula (Ia'), having at least one of R is —H and at least one R is selected from —C(O)R$^1$, are commonly known as alkyl sorbitans. These sorbitans can be di-substituted or tri-substituted with —C(O)R$^1$. It is known that commercially available sorbitans, such as SPAN, contain a mixture of the various sorbitans ranging from where each R is H (un-substituted), and sorbitans where each R is —C(O)R$^1$ (fully substituted); wherein R$^1$ is a linear or branched alkyl group having 5 to 29 carbons; and mixtures of various substitutions thereof. The commercially available sorbitans may also include amounts of sorbitol, isosorbide, or other intermediates or byproducts.

In one embodiment, at least two R groups are —C(O)R$^1$, and R$^1$ is a linear branched alkyl group having 5 to 29 carbons. In another embodiment, R$^1$ is a linear or branched alkyl group having 7 to 21 carbons, and in a third embodiment, R$^1$ is a linear or branched alkyl group having 11 to 21 carbons. Preferred compounds used to form these residues include di- and tri-substituted sorbitans derived from caprylic acid, capric acid, lauric acid, mysteric acid, palmitic acid, stearic acid, arachidic acid, behenic acid, lignoceric acid, and mixtures thereof. Particularly preferred compounds include di- and tri-substituted sorbitan stearates or sorbitan behenins.

Optionally, R$^1$ is a linear or branched alkyl group having 5 to 29 carbons comprising at least 1 unsaturated bond. Examples of compounds of formula (Ia) wherein at least two R groups are selected from —C(O)R$^1$; and R$^1$ contains least 1 unsaturated bond, include, but are not limited to, sorbitan trioleate (i.e., wherein R$^1$ is —C$_7$H$_{14}$CH=CHC$_8$H$_{17}$). Other examples but are not limited to include di- and tri-substituted sorbitans derived from palmitoleic acid, lineolic acid, arachidonic acid, and erucic acid.

In one embodiment, a compound of formula (Ia) is employed, wherein at least two R groups are independently —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$. Compounds of formula (Ia), wherein at least two R groups are —(CH$_2$CH$_2$O)$_n$(CH(CH$_3$)CH$_2$O)$_m$R$^2$ or —(CH$_2$CH$_2$O)$_n$(CH(CH$_3$)CH$_2$O)$_m$C(O)R$^1$, wherein each m is independently 0 to 20, each n is independently 0 to 20, and n+m is greater than 0 are known as polysorbates and are commercially available under the tradename TWEEN. These polysorbates can be di-substituted or tri-substituted with alkyl groups R$^1$ or R$^2$. It is known that commercially available polysorbates contain a mixture of the various polysorbates ranging from where each R$^2$ is H (unsubstituted), and polysorbates where each R$^1$ is a linear or branched alkyl group having 5 to 29 carbons (fully substituted); and mixtures of various substitutions thereof. Examples of compounds of formula (Ia) include polysorbates such as polysorbate tristearate and polysorbate monostearate. Examples of compounds of formula (Ia) wherein m+n is greater than 0, and wherein R$^1$ comprises at least 1 unsaturated bond, but not limited to, polysorbate trioleate (wherein R$^1$ is C$_7$H$_{14}$CH=CHC$_8$H$_{17}$) and are sold commercially under the name Polysorbate 80. Reagents may include mixtures of compounds having various values for R, R$^1$, and R$^2$, and may also include mixtures of compounds where R$^1$ comprises at least one unsaturated bond with compounds where R$^1$ is fully saturated.

Compounds of formula (Ib) are known as alkyl citrates. These citrates can be present as a di-substituted or tri-substituted with alkyl groups. It is known that commercially available citrates contain a mixture of the various citrates as well as citric acids from where R and each R$^4$ is —H, ranging to citrates where each R$^4$ is a linear or branched alkyl group having 6 to 30 carbons optionally comprising at least 1 unsaturated bond; and mixtures of various substitutions thereof. Mixtures of citrates having various values for R$^1$, R$^2$, and R$^4$ may be used, and may also include mixtures of compounds where R$^1$ comprises at least one unsaturated bond with compounds where R$^1$ is fully saturated. Alkyl citrates are also commercially available wherein m+n is greater than 0, R$^4$ is —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$ and are present in the various substitutions from wherein R and each R$^2$ is H to wherein each R$^1$ and/or R$^2$ is a linear or branched alkyl group having 5 to 30 carbons optionally comprising at least 1 unsaturated bond. Examples of compounds of formula (Ib) include, but are not limited to, trialkyl citrates.

Compounds of Formula (Ic) are known as pentaerythritol esters. These pentaerythritol esters can be present as a di-substituted or tri-substituted with alkyl groups. Preferred compounds used to form X of Formula (Ic) are dipentaerythritol esters, where R$^{19}$ is —CH$_2$C[CH$_2$OR]$_3$. It is known that commercially available pentaerythritol esters contain a mixture of the various pentaerythritol esters where R$^{19}$ and each R is —H, ranging to pentaerythritol esters where each R is —C(O)R$^1$, and R$^1$ is a linear or branched alkyl group having 5 to 29 carbons optionally comprising at least 1 unsaturated bond; and mixtures of various substitutions thereof. The pentaerythritol esters also may contain compounds with mixtures of different chain lengths for R, or mixtures of compounds where R$^1$ comprises at least one unsaturated bond with compounds where R$^1$ is fully saturated.

Compounds of formulas (Ia), (Ib), and (Ic) can all be bio-based derived. By "bio-based derived", it is meant that at least 10% of the material can be produced from non-crude oil sources, such as plants, other vegetation, and tallow. In one embodiment, the hydrophobic compound is from about 10% to 100% bio-based derived. In one embodiment, hydrophobic compound is from about 35% to 100% bio-based derived. In another embodiment, hydrophobic compound is from about 50% to 100% bio-based derived. In one embodiment, hydrophobic compound is from about 75% to 100% bio-based derived. In one embodiment, hydrophobic compound is 100% bio-based derived. The average OH value of the hydrophobic compounds can range from just greater than 0 to about 230. In one embodiment, the average OH value is from about 10 to about 175, and in another embodiment, the average OH value is from about 25 to about 140.

The coating on the article surface comprises 5 to 95% by weight of a hydrophobic compound, and 5 to 95% by weight of a surface effect agent, both based on the total solids weight of the coating. In a second aspect, the coating on the article surface comprises 10 to 90% by weight of a hydrophobic compound, and 10 to 90% by weight of a surface effect agent, both based on the total solids weight of the coating; and in a third aspect, 20 to 80% by weight of a hydrophobic compound, and 20 to 80% by weight of a surface effect agent, both based on the total solids weight of the coating. The term "solids weight of the coating", is used to mean the sum of the coating components that would remain once the aqueous, solvent, or other liquid components evaporated. In other words, it is the sum of the non-aqueous, non-solvent, and non-volatile components of the coating. The coating may further comprise aqueous or organic solvents, polymer resins, pigments, functional additives, and surfactants.

Surface effect agents provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. Such materials can be in the form of hydrophobic non-fluorinated cationic acrylic polymers, hydrophobic non-fluorinated anionic acrylic polymers, hydrophobic non-fluorinated nonionic acrylic polymers, hydrophobic non-fluorinated urethanes, non-fluorinated organosilanes, silicones, waxes, including paraffins, and mixtures thereof. Some stain release and soil release agents are hydrophilic and include compounds such as polymethyl acrylates or hydrophilic urethanes. These compounds may also be used as surface effect agents and combined with the hydrophobic compounds, from about 5:95 to 95:5 in one aspect; from about 10:90 to 90:10 in a second aspect; and from about 20:80 to 80:20 in a third aspect, based on the total solids weight of the coating. In another embodiment, the compounds are used as surface effect agents and combined with the hydrophobic compounds, from about 21:79 to 79:21 in one aspect; from about 25:75 to 75:25 in a second aspect; and from about 30:70 to 70:30 in a third aspect, based on the total solids weight of the coating.

Superior properties, along with desirable properties of low yellowing and good durability, are imparted to articles by the combination of the hydrophobic compounds to hydrophobic surface effect agents before application to the articles. These combined blends are applied to the articles in the form of a dispersion in water or other solvent either before, after or during the application of other treatment chemicals.

Hydrophobic non-fluorinated acrylic polymers include copolymers of monovinyl compounds, including alkyl (meth)acrylates, vinyl esters of aliphatic acids, styrene and alkyl styrene, vinyl halides, vinylidene halides, alkyl esters, vinyl alkyl ketones, and acrylamides. The conjugated dienes are preferably 1,3-butadienes. Representative compounds within the preceding classes include the methyl, propyl, butyl, 2-hydroxypropyl, 2-hydroxyethyl, isoamyl, 2-ethylhexyl, octyl, decyl, lauryl, cetyl, and octadecyl acrylates and methacrylates; vinyl acetate, vinyl propionate, vinyl caprylate, vinyl laurate, vinyl stearate, styrene, alpha methyl styrene, p-methylstyene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene, isoprene, N-methylolacrylamide, N-methylolmethacrylamide, glycidyl acrylate, glycidyl methacrylate, amine-terminated (meth)acrylates, and polyoxy(meth)acrylates.

Hydrophobic non-fluorinated urethanes include, for example, urethanes synthesized by reacting an isocyanate compound with the hydrophobic compounds described above as an alcohol reagent. These compounds are described in US2014/0295724 and US2016/0090508. Hydrophobic non-fluorinated nonionic acrylic polymers include, for example, polymers made by polymerizing or copolymerizing an acrylic ester of the hydrophobic compounds described above. Such compounds are described in US2016/0090686.

The coatings of the present invention applied to fibrous substrates optionally further comprise a blocked isocyanate to promote durability, added after copolymerization (i.e., as a blended isocyanate). An example of a suitable blocked isocyanate is PHOBOL XAN available from Huntsman Corp, Salt Lake City, Utah Other commercially available blocked isocyanates are also suitable for use herein. The desirability of adding a blocked isocyanate depends on the particular application for the copolymer. For most of the presently envisioned applications, it does not need to be present to achieve satisfactory cross-linking between chains or bonding to fibers. When added as a blended isocyanate, amounts up to about 20% by weight are added.

The coating composition of the present invention optionally further comprises additional components such as additional treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the blended composition and applied to the fibrous substrate. Other additives commonly used with such treating agents or finishes may also be present such as surfactants, pH adjusters, cross linkers, wetting agents, and other additives known by those skilled in the art. Further, other extender compositions are optionally included to obtain a combination of benefits.

For example, when synthetic fabrics are treated, a wetting agent can be used, such as ALKANOL 6112 available from E. I. du Pont de Nemours and Company, Wilmington, Del. As a further example, when cotton or cotton-blended fabrics are treated, a wrinkle-resistant resin can be used such as PERMAFRESH EFC available from Emerald Carolina, LLC, Cahrlotte, N.C. As a further example, when nonwoven fabrics are treated, a wax extender can be employed such as FREEPEL 1225WR, available from Omnova Solutions Chester, S.C. An antistat such as ZELEC KC, available from Stepan, Northfield, Ill., or a wetting agent, such as hexanol, also are suitable. The dispersions are generally applied to fibrous substrates by spraying, dipping, padding, or other well-known methods. After excess liquid has been removed, for example by squeeze rolls, the treated fibrous substrate is dried and then cured by heating, for example, to from about 100° C. to about 190° C., for at least 30 seconds, typically from about 60 to about 240 seconds. Such curing enhances oil-, water- and soil repellency and durability of the repellency. While these curing conditions are typical, some commercial apparatus may operate outside these ranges because of its specific design features.

In one embodiment, the present invention is a method of imparting a surface effect to an article comprising contacting a the surface of the article with a coating to form a partially or completely coated article, wherein the coating comprises 5 to 95% by weight of a hydrophobic compound, and 5 to 95% by weight of at least one surface effect agent, both based on the total solids weight of the coating, selected from a cyclic or acyclic sugar alcohol which is substituted with at least one —$R^1$, —$C(O)R^1$, —$(CH_2CH_2O)_n(CH(CH_3)CH_2O)_mR^2$, $(CH_2CH_2O)_n(CH(CH_3)CH_2O)_mC(O)R^1$, or mixtures thereof; where the cyclic or acyclic sugar alcohol is selected from a saccharide, reduced sugar, aminosaccharide, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, a linear or branched alkyl group having 6 to 30 carbons optionally comprising at least 1 unsaturated bond.

In another aspect, the invention is a method of imparting a surface effect to an article comprising contacting a the surface of the article with a durable non-fluorinated coating to form a partially or completely coated article, wherein the coating comprises 5 to 95% by weight of a hydrophobic compound, and 5 to 95% by weight of at least one surface effect agent, both based on the total solids weight of the coating, selected from a cyclic or acyclic alcohol which is substituted with at least two —$R^1$, —$C(O)R^1$, —$(CH_2CH_2O)_n(CH(CH_3)CH_2O)_mR^2$, $(CH_2CH_2O)_n(CH(CH_3)CH_2O)_mC(O)R^1$, or mixtures thereof; where the cyclic or acyclic alcohol is selected from a pentaerythritol, saccharide, reduced sugar, aminosaccharide, citric acid, aldonic acid, or aldonic acid lactone; wherein each n is independently 0 to 20; each m is independently 0 to 20; m+n is greater than 0; each $R^1$ is independently a linear or branched alkyl group having 5 to 29 carbons optionally comprising at least 1 unsaturated bond; each $R^2$ is independently —H, a linear or branched alkyl group having 6 to 30 carbons optionally comprising at least 1 unsaturated bond.

The articles may include but are not limited to a fiber, textile, fabric, fabric blend, paper, nonwoven, leather, proppant particle, inorganic oxide particle, unglazed concrete, brick, tile, granite, limestone, marble, grout, mortar, statuary, monument, wood, composite material, terrazzo, glass, thermoplastic sheet, thermoformed or molded article, foam sheet or article, metal, seed, painted fabric or canvas, or a combination thereof. The contacting step may occur by applying the hydrophobic compound in the form of an aqueous solution, aqueous dispersion, organic solvent solution or dispersion, or cosolvent solution or dispersion. The contacting step may occur by any conventional method, including but not limited to spraying, rolling, dip-squeeze, painting, dripping, powder coating, mixing the article in a liquid carrier of the hydrophobic compound, tumbling, or screen printing.

In one aspect, the method further comprises the step of heating the partially or completely coated article. For example, the hydrophobic agent may be applied alone or in liquid carrier, and the treated article may be heated to melt, flow, dry, or otherwise fix the hydrophobic agent onto the article surface. The final coating on the article surface will be a solidified, lasting, permanent coating. In another aspect, the method further comprises the step of solidifying the coating by drying, cooling, or allowing to cool. The liquid carrier, if used, may be dried by heating or air drying to allow for evaporation of the liquid carrier, thus leaving a permanent solid coating.

In one aspect, the contacting step occurs inside a laundry machine. Specific methods that may be used are described in US2016/0090560. For example, water is used to help disperse the coating composition, such as by a wash cycle or rinse cycle of the laundry machine. The water temperature used in the wash cycle or rinse cycle may be any temperature including cold, room temperature, warm, or hot. Methods of contacting the additive with the substrate include, but are not limited to, introducing the laundry treatment composition by pouring the treatment composition into the basin of the laundry machine, pouring the treatment composition into a detergent or treating agent reservoir of the laundry machine, adding a dissolvable pouch containing the additive composition, or adding a controlled-release reusable container containing the additive composition. Any of the above methods may also be employed using a laundry additive composition comprising two laundry treatment compositions. Alternatively, the laundry additive composition or laundry treatment composition may be introduced into an aqueous liquor and contacted with a fibrous substrate into a tub, bucket or sink, such as when washing fabrics by hand.

In one embodiment, the laundry treatment composition or laundry additive composition is poured into the wash basin, or into a detergent or treating agent reservoir, of the laundry machine and the machine is programmed to run a wash cycle or rinse cycle. In one embodiment, the wash basin is partially filled with water, the laundry treatment composition or laundry additive composition is poured into the water, and the water is allowed to fill the wash basin. Detergent is then optionally added, the fibrous substrate is added to the wash basin, and the laundry machine is allowed to run a full wash or rinse cycle.

The method may further comprise a step of curing the coating with heat. Any suitable heating method may be used, such as machine drying in a dryer, ironing, steaming, blow drying, drying under a heat lamp, or drying near a radiative source of heat. In one embodiment, the cure step occurs at a temperature of about 30° C. to about 100° C. In another embodiment, the cure step occurs at a temperature of about 35° C. to about 80° C., and in another embodiment the temperature is about 40° C. to about 60° C., for a time of at least 30 minutes, preferably at least 35 minutes, and more preferably at least 40 minutes. Any drying method can be practiced, including air drying, tumbling dry, or heating the substrate to dryness. Such drying cycles are commonly found on clothes drying machines, including a tumble dry cycle, a tumble dry with heat cycle, or a heated non-tumble cycle. In one embodiment, the treated substrate is tumbled dry with heat. Such curing enhances oil-, water- and soil repellency and durability of the repellency. While these curing conditions are typical, some commercial apparatus may operate outside these ranges because of its specific design features.

In one embodiment, the articles are fibrous substrates, including fibers, textiles, paper, nonwovens, leather, fabrics, fabric blends or a combination thereof. By "fabrics" is meant natural or synthetic fabrics, or blends thereof, composed of fibers such as cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of at least one natural fiber and at least one synthetic fiber, but also can be a blend of two or more natural fibers or of two or more synthetic fibers.

In one aspect, the article is a solid proppant particle or inorganic oxide particle. The solid proppant may be coated by any suitable method known to one skilled in the art. One suitable method includes mixing the hydrophobic compound overnight with water at a pH of 5. The solid proppant is then contacted with the liquid hydrophobic compound dispersion and mixed by roll-mill for 5 minutes. The surface-treated proppant is then separated from the excess liquid and dried in an oven at 100° C. to provide a solid surface-treated proppant. Proppant materials to be surface-treated include but are not limited to sand, thermoplastic particles, alumina particles, glass bubble or glass bead particles, and clay particles. Preferably, the proppant material is sand. The surface-treated proppants of the present invention have a mesh size of at least 100 (up to and including 149 micrometers).

Specifically, the treated articles of the present invention are useful to provide enhanced surface properties, especially durability of oil-, water- and soil-repellency, while reducing or eliminating the amount of fluorinated compounds employed. The repellency property is effective with a variety of other surface effects.

Test Methods

All solvents and reagents, unless otherwise indicated, were purchased from Sigma-Aldrich, St. Louis, Mo., and used directly as supplied. Sorbitan tristearate, sorbitan trilaurate, and 50:50 sorbitan tribehenate:sorbitan tristearate blend are available from DuPont Nutrition & Health, Copenhagen, Denmark. Decaglycerol decaoleate is available from Lonza, Allendale, N.J. Sorbitan trioleate is available from Oleon, Ghent, Belgium.

ARMEEN DM-18D was obtained from Akzo-Nobel, Bridgewater, N.J. PHOBOL XAN was obtained from Huntsman Corp, Salt Lake City, Utah STEPOSOL SB-W was obtained from Stepan, Northfield, Ill. VMA-70 is available from NOF Corporation.

CHEMIDEX S is a stearaminopropyl dimethylamine surfactant available from Lubrizol, Wickliffe, Ohio.

ETHAL LA-4 is an ethoxylated emulsifier available from Ethox Chemicals, Greenville, S.C.

CAPSTONE 6,2-FMA and ZELAN R3 are available from The Chemours Company, Wilmington, Del.

The following tests were employed in evaluating the examples herein.
Test Method 1—Fabric Treatment The fabrics treated in this study were 100% by weight polyester fabric available from L. Michael OY, Finland or 100% by weight nylon fabric available from Huntsman Corp, Salt Lake City, Utah The fabric was treated with the aqueous dispersions of hydrophobic compounds and surface effect polymers using a conventional pad bath (dipping) process. The prepared concentrated dispersions were diluted with deionized water to achieve a pad bath having 60 g/L of the final emulsion in the bath. For the treatment of the cotton fabric, a wetting agent, INVADINE PBN and a catalyzed cross-linking agent, KNITTEX 7636 (all available from Huntsman, Salt Lake City, Utah) were also included in the bath at 5 g/L and 30 g/L respectively. The fabric was padded in the bath, and the excess liquid was removed by squeeze rollers. The wet pickup was around 95% on the cotton substrate. The "wet pick up" is the weight of the bath solution of the emulsion polymer and additives applied to the fabric, based on the dry weight of the fabric. The fabric was cured at approximately 165° C. for 3 minutes and allowed to "rest" after treatment and cure for at least 2 hours.

For the treatment of the polyester fabric, a wetting agent, INVADINE® PBN (available from Huntsman, Charlotte, N.C., USA) and 60% acetic acid were also included in the bath at 5 g/L and 1 g/L respectively. The fabric was padded in the bath, and the excess liquid removed by squeeze rollers. The wet pickup was around 55% on the polyester substrate. The "wet pick up" is the weight of the bath solution of the emulsion polymer and additives applied to the fabric, based on the dry weight of the fabric. The fabric was cured at approximately 160° C. for 2 minutes and allowed to "rest" after treatment and cure for about 15 to about 18 hours.
Test Method 2—Water Drop Rating The water repellency of a treated textile substrate was measured according to AATCC standard Test Method No. 193 and the method outlined in the Teflon® Global Specifications and Quality Control Tests booklet. The higher the water drop rating, the better the resistance the finished substrate has to staining by water-based substances.
Test Method 3—Water Spray Repellency Water repellency was further tested by utilizing the spray test method which is a measure of dynamic water repellency. The treated fabric samples were tested for water repellency according to AATCC standard Test Method No. 22 and the method outlined in the Teflon® Global Specifications and Quality Control Tests booklet. A rating of 90 denotes slight random sticking or wetting without penetration; lower values indicate progressively greater wetting and penetration.
Test Method 4—Oil Rating The treated fabric samples were tested for oil repellency by a modification of AATCC standard Test Method No. 118, and the method outlined in the Teflon® Global Specifications and Quality Control Tests booklet. The higher the oil drop rating, the better the resistance the finished substrate has to staining by oil-based substances.
Test Method 5—Bundesmann Absorbency (ABS)

The treated fabric samples were tested for dynamic water absorbency following ISO 9865 standard Test Method.
Test Method 6—Wash Durability The fabric samples were laundered according to International Standard specified domestic washing procedure for textile testing. Fabric samples were loaded into a horizontal drum, front-loading type (Type A, WASCATOR FOM 71MP-Lab) of automatic washing machine with a ballast load to give a total dry load of 4 lb. A commercial detergent was added (AATCC 1993 standard Reference Detergent WOB) and the washer program 6N was used to simulate 20 home washes (20HW) or 30 home washes (30HW). After washing was complete, the entire load was placed into a KENMORE automatic dryer and dried on high for 45-50 min.

EXAMPLES

Examples 1-18 and Comparative Examples A-C

ARMEEN DM18D (24.7 g), DI water (2066 g), 2-ethylhexyl methacrylate (1076 g), 7-EO methacrylate (154 g), N-methylolacrylamide (48%, 31 g), dodecyl mercaptans (1.5 g), 2% NaCl solution (58 g), glacial acetic acid (17 g), and hexylene glycol (308 g) were mixed and later blended in a large commercial blender for 2 minutes. An additional 200 g of DI water was added. The resulting mixture was transferred into a reactor, stirred at 75° C., and sparged with nitrogen for 30 minutes. VAZO 56 (2.5 g) was added with 61 g of DI water, and the mixture was stirred for 4 hours to yield a non-fluorinated acrylic dispersion product (NFAD) at 33.55% solids.

Into a 4-neck round bottom flask equipped with an overhead stirrer, thermocouple and condenser is added sorbitan tristearate (111 g) and 4-methyl-2-pentanone (MIBK, 274 g). The solution is heated to 80° C. An aqueous dispersion is then prepared by adding warm water (512 g), CHEMIDEX S (2.4 g), ETHAL LA-4 (3.2 g) and acetic acid (1.6 g) at 65° C. The mixture is immersion blended (2 min), homogenized at 6000 psi, and the resulting dispersion is distilled under reduced pressure to remove the solvent and yield a non-flammable dispersion at 13.15% solids after cooling and filtering. The resulting dispersion is blended with ZELAN R3 and NFAD and applied to the fabric at 60 g/L of solids content or 40 g/L in the weight ratios described in Table 1. The samples are tested according to the test methods above.

TABLE 1

Composition of Examples 1-18 and Comparative Examples A-C

| Example | Hydrophobic compound dispersion | ZELAN R3 | NFAD |
|---|---|---|---|
| 1 | 0.33 | 0.33 | 0.33 |
| 2 | 0.20 | 0.40 | 0.40 |
| 3 | 0.80 | 0.20 | — |
| 4 | 0.40 | 0.40 | 0.20 |
| 5 | 0.40 | 0.60 | — |
| 6 | 0.20 | 0.80 | — |
| 7 | 0.17 | 0.17 | 0.67 |
| 8 | 0.80 | — | 0.20 |
| 9 | 0.40 | 0.20 | 0.40 |
| 10 | 0.17 | 0.67 | 0.17 |
| 11 | 0.67 | 0.17 | 0.17 |
| A | — | 0.20 | 0.80 |
| B | 1.00 | — | — |
| 12 | 0.40 | — | 0.60 |
| 13 | 0.20 | — | 0.80 |
| C | — | 0.80 | 0.20 |
| 14 | 0.20 | 0.60 | 0.20 |
| 15 | 0.20 | 0.20 | 0.60 |
| 16 | 0.60 | 0.20 | 0.20 |
| 17 | 0.60 | 0.40 | — |
| 18 | 0.60 | — | 0.40 |

TABLE 2

Performance of Examples 1-18 and Comparative Examples A-C Applied at 60 g/L

| | Spray Rating | | ABS % | |
|---|---|---|---|---|
| Example | Initial | 30HW (60° C.) | Initial | 30HW (60° C.) |
| 1 | 100 | 100 | 37.5 | 11.6 |
| 2 | 100 | 100 | 27.7 | 16.6 |
| 3 | 100 | 100 | 64.4 | 22.5 |
| 4 | 100 | 100 | 33.8 | 7.5 |
| 5 | 100 | 100 | 36.2 | 6.1 |
| 6 | 100 | 100 | 20.5 | 5.3 |
| 7 | 100 | 90 | 35.1 | 25.1 |
| 8 | 100 | 100 | 53.6 | 26.5 |
| 9 | 100 | 100 | 47.2 | 18.9 |
| 10 | 100 | 100 | 29.3 | 5 |
| 11 | 100 | 100 | 32.2 | 5.3 |
| A | 80 | 70 | 49.7 | 16.97 |
| B | 70 | 70 | 41 | 36.6 |
| 12 | 80 | 70 | 59.9 | 31.95 |
| 13 | 80 | 70 | 42.7 | 21 |
| C | 100 | 100 | 15.8 | 4.9 |
| 14 | 100 | 100 | 28.9 | 5.1 |
| 15 | 100 | 100 | 40 | 24.97 |
| 16 | 100 | 100 | 43.6 | 6.5 |
| 17 | 100 | 100 | 53.3 | 12.6 |
| 18 | 100 | 100 | 55.1 | 15.8 |

TABLE 3

Performance of Examples 1-18 and Comparative Examples A-C Applied at 40 g/L

| | Spray Rating | | ABS % | |
|---|---|---|---|---|
| Example | Initial | 30HW (60° C.) | Initial | 30HW (60° C.) |
| 1 | 100 | 100 | 34.5 | 12.3 |
| 2 | 100 | 100 | 39.1 | 12 |
| 3 | 100 | 100 | 53.4 | 23.2 |
| 4 | 100 | 100 | 32.1 | 7.4 |
| 5 | 100 | 100 | 39.9 | 5.5 |
| 6 | 100 | 100 | 31.1 | 3.5 |
| 7 | 100 | 90 | 42.9 | 23.8 |
| 8 | 100 | 100 | 49.7 | 24.8 |
| 9 | 100 | 100 | 43.2 | 15.96 |
| 10 | 100 | 100 | 34.9 | 5 |
| 11 | 100 | 100 | 50.5 | 5.3 |
| A | 70 | 100 | 60.3 | 27.1 |
| B | 80 | 100 | 48.6 | 23.7 |
| 12 | 80 | 80 | 47.4 | 31.6 |
| 13 | 100 | 100 | 22.7 | 3.7 |
| C | 100 | 100 | 35.1 | 4.7 |
| 14 | 100 | 100 | 40.1 | 20.1 |
| 15 | 100 | 100 | 46.9 | 9.2 |
| 16 | 100 | 100 | 42.8 | 25.8 |
| 17 | 100 | 100 | 50.7 | 22.5 |
| 18 | 100 | 100 | 34.5 | 12.3 |

What is claimed is:

1. A coated article comprising a complete durable non-fluorinated coating on a surface of an article,
wherein the coating is in the form of an aqueous solution, aqueous dispersion, organic solvent solution or dispersion, or cosolvent solution or dispersion,
wherein the coating comprises 10 to 90% by weight of a hydrophobic compound, and 10 to 90% by weight of at least one surface effect agent, both based on the total solids weight of the coating; wherein
the surface effect agent is in the form of at least one of hydrophobic non-fluorinated cationic acrylic polymers, hydrophobic non-fluorinated anionic acrylic polymers, hydrophobic non-fluorinated nonionic acrylic polymers, hydrophobic non-fluorinated urethanes, non-fluorinated organosilanes, silicones, or mixtures thereof;
each n is independently 0 to 20;
each m is independently 0 to 20;
m+n is greater than 0;
each $R^1$ is independently a linear or branched alkyl group having 5 to 29 carbons; and
each $R^2$ is independently a linear or branched alkyl group having 6 to 30 carbons;
wherein if the surface effect agent is a hydrophobic non-fluorinated urethane, the coating is in the form of an aqueous solution or an aqueous dispersion; and wherein the hydrophobic compound has formula (Ia):

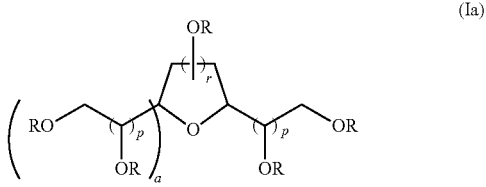

wherein each R is independently —H; —R$^1$; —C(O)R$^1$;
—(CH$_2$CH$_2$O)$_n$(CH(CH$_3$)CH$_2$O)$_m$R$^2$; or
—(CH$_2$CH$_2$O)$_n$(CH(CH$_3$)CH$_2$O)$_m$C(O)R$^1$;
each n is independently 0 to 20;
each m is independently 0 to 20;
m+n is greater than 0;
r is 1 to 3;
a is 0 or 1;
p is independently 0 to 2;
provided that a is 0 when r is 3;
each R$^1$ is independently a linear or branched alkyl group having 5 to 29 carbons;
each R$^2$ is independently a linear or branched alkyl group having 6 to 30 carbons; and
at least one R is —H and at least two R groups are a —R$^1$; —C(O)R$^1$; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$.

2. The coated article of claim 1, where the hydrophobic compound is selected from formula (Ia) to be formula (Ia'):

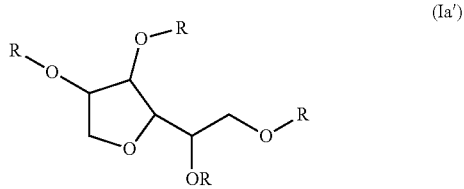

wherein R is further limited to independently —H; —R$^1$; or —C(O)R$^1$.

3. The coated article of claim 1, where the hydrophobic compound is selected from formula (Ia) to be formula (Ia'):

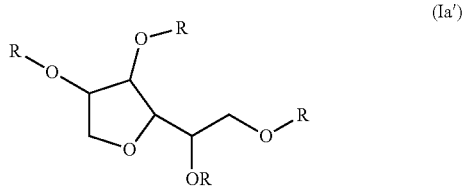

wherein R is further limited to independently —H; —(CH$_2$CH$_2$O)$_n$(CH(CH$_3$)CH$_2$O)$_m$R$^2$; or —(CH$_2$CH$_2$O)$_n$(CH(CH$_3$)CH$_2$O)$_m$C(O)R$^1$.

4. The coated article of claim 1, wherein the surface effect is no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, anti-blocking, cleanability, dust resistance, leveling, corrosion resistance, acid resistance, anti-fog, anti-ice, or tanning.

5. The coated article of claim 1, where the coating comprises 20 to 80% by weight of a hydrophobic compound, and 20 to 80% by weight of a surface effect agent, both based on the total solids weight of the coating.

6. The coated article of claim 1 wherein the article is a fiber, textile, fabric, fabric blend, paper, nonwoven, leather, proppant particle, inorganic oxide particle, unglazed concrete, brick, tile, granite, limestone, marble, grout, mortar, statuary, monument, glass, thermoplastic sheet, thermoformed or molded article, foam sheet or article, metal, seed, painted fabric or canvas, or a combination thereof.

7. The coated article of claim 1, wherein if the surface effect agent is a hydrophobic non-fluorinated urethane, the hydrophobic non-fluorinated urethane is a reaction product of an isocyanate compound and a cyclic or acyclic alcohol substituted with at least two —R$^1$, —C(O)R$^1$, (CH$_2$CH$_2$O)$_n$(CH(CH$_3$)CH$_2$O)$_m$R$^2$, —(CH$_2$CH$_2$O)$_n$(CH(CH$_3$)CH$_2$O)$_m$C(O)R$^1$, or mixtures thereof, where:
each n is independently 0 to 20;
each m is independently 0 to 20;
m+n is greater than 0;
each R$^1$ is independently a linear or branched alkyl group having 5 to 29 carbons; and
each R$^2$ is independently a linear or branched alkyl group having 6 to 30 carbons.

8. A method of imparting a surface effect to an article comprising contacting a surface of the article with a durable non-fluorinated coating to form a completely coated article,
wherein the coating is in the form of an aqueous solution, aqueous dispersion, organic solvent solution or dispersion, or cosolvent solution or dispersion,
wherein the coating comprises 10 to 90% by weight of a hydrophobic compound, and 10 to 90% by weight of at least one surface effect agent, both based on the total solids weight of the coating; wherein
the surface effect agent is in the form of at least one of hydrophobic non-fluorinated cationic acrylic polymers, hydrophobic non-fluorinated anionic acrylic polymers, hydrophobic non-fluorinated nonionic acrylic polymers, hydrophobic non-fluorinated urethanes, non-fluorinated organosilanes, silicones, or mixtures thereof;
each n is independently 0 to 20;
each m is independently 0 to 20;
m+n is greater than 0;
each R$^1$ is independently a linear or branched alkyl group having 5 to 29 carbons; and
each R$^2$ is independently a linear or branched alkyl group having 6 to 30 carbons;
wherein if the surface effect agent is a hydrophobic non-fluorinated urethane, the coating is in the form of an aqueous solution or an aqueous dispersion; and
wherein the hydrophobic compound has formula (Ia):

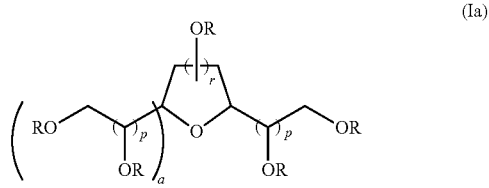

wherein each R is independently —H; —R$^1$; —C(O)R$^1$;
—(CH$_2$CH$_2$O)$_n$(CH(CH$_3$)CH$_2$O)$_m$R$^2$; or —(CH$_2$CH$_2$O)$_n$(CH(CH)CH$_2$O)$_m$C(O)R$^1$;

each n is independently 0 to 20;
each m is independently 0 to 20;
m+n is greater than 0;
r is 1 to 3;
a is 0 or 1;
p is independently 0 to 2;
provided that a is 0 when r is 3;
each $R^1$ is independently a linear or branched alkyl group having 5 to 29 carbons;
each $R^2$ is independently a linear or branched alkyl group having 6 to 30 carbons; and
at least one R is —H and at least two R groups are a —$R^1$; —C(O)$R^1$; —(CH$_2$CH$_2$O)$_n$CH(CH$_3$)CH$_2$O)$_m$$R^2$; or —(CH$_2$CH$_2$O)$_n$(CH(CH$_3$)CH$_2$O)$_m$C(O)$R^1$.

9. The method of claim 8, further comprising the step of heating the completely coated article.

10. The method of claim 8, further comprising the step of solidifying the coating by drying, cooling, or allowing to cool.

11. The method of claim 8, where the step of contacting is by spraying, rolling, dip-squeeze, painting, sprinkling, dripping, powder coating, mixing the article in a liquid carrier of the hydrophobic compound, tumbling, or screen printing.

12. The method of claim 8, where the stop of contacting occurs inside a laundry machine.

13. A coated article comprising a complete durable non-fluorinated coating on a surface of an article,
wherein the coating comprises 10 to 90% by weight of a hydrophobic compound, and 10 to 90% by weight of at least one surface effect agent, both based on the total solids weight of the coating; wherein
the surface effect agent is in the form of at least one of hydrophobic non-fluorinated cationic acrylic polymers, hydrophobic non-fluorinated anionic acrylic polymers, hydrophobic non-fluorinated nonionic acrylic polymers, hydrophobic non-fluorinated urethanes, non-fluorinated organosilanes, silicones, or mixtures thereof;

each n is independently 0 to 20;
each m is independently 0 to 20;
m+n is greater than 0;
each $R^1$ is independently a linear or branched alkyl group having 5 to 29 carbons; and
each $R^2$ is independently a linear or branched alkyl group having 6 to 30 carbons;
wherein if the surface effect agent is a hydrophobic non-fluorinated urethane, the coating is in the form of an aqueous solution or an aqueous dispersion;
wherein the hydrophobic compound has formula (Ia):

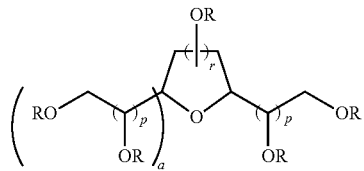

(Ia)

wherein each R is independently —H; —$R^1$; —C(O)$R^1$; —(CH$_2$CH$_2$O)$_n$(CH(CH$_3$)CH$_2$O)$_m$$R^2$; or —(CH$_2$CH$_2$O)$_n$(CH(CH$_3$)CH$_2$O)$_m$C(O)$R^1$;
each n is independently 0 to 20;
each m is independently 0 to 20;
m+n is greater than 0;
r is 1 to 3;
a is 0 or 1;
p is independently 0 to 2;
provided that a is 0 when r is 3;
each $R^1$ is independently a linear or branched alkyl group having 5 to 29 carbons;
each $R^2$ is independently a linear or branched alkyl group having 6 to 30 carbons; and
at least one R is —H and at least two R groups are a —$R^1$; —C(O)$R^1$; —(CH$_2$CH$_2$O)$_n$CH(CH$_3$)CH$_2$O)$_m$$R^2$; or —(CH$_2$CH$_2$O)$_n$(CH(CH$_3$)CH$_2$O)$_m$C(O)$R^1$.

* * * * *